Dec. 3, 1940.　　B. BARNES ET AL　　2,223,934
METHOD FOR DECOMPOSING ACID SLUDGE
Filed Sept. 17, 1938
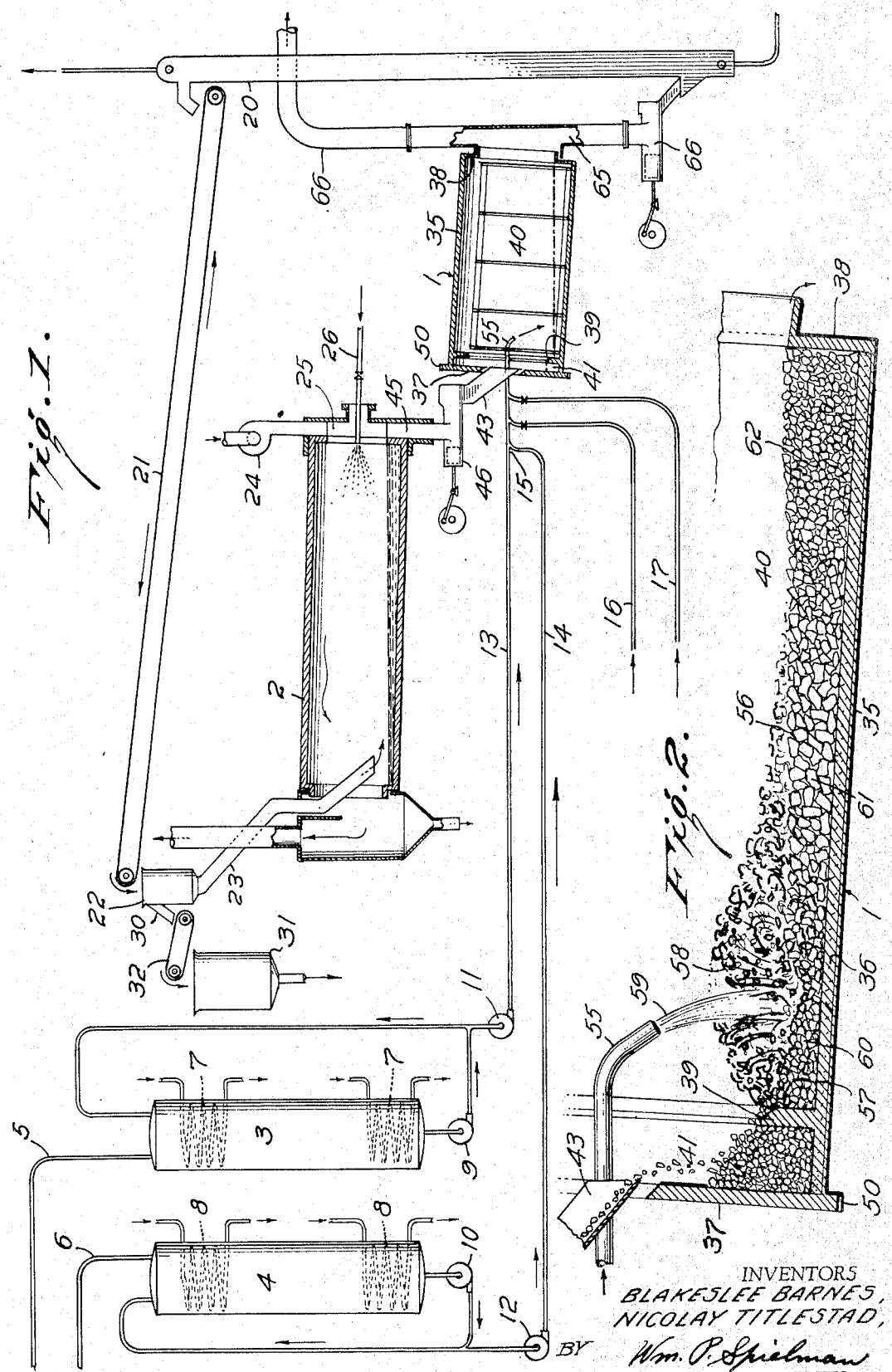
INVENTORS
BLAKESLEE BARNES,
NICOLAY TITLESTAD,
BY Wm. P. Spielman
ATTORNEY.

Patented Dec. 3, 1940

2,223,934

UNITED STATES PATENT OFFICE 2,223,934

METHOD FOR DECOMPOSING ACID SLUDGE

Blakeslee Barnes, New York, and Nicolay Titlestad, White Plains, N. Y., assignors to Chemical Construction Corporation, New York, N. Y., a corporation of Delaware Application September 17, 1938, Serial No. 230,372

6 Claims. (Cl. 23—177)

This invention relates to the thermal decomposition of acid sludges such as are obtained by the sulfuric acid refining of petroleum hydrocarbons or other hydrocarbons containing unsaturates which can be removed by agitation with sulfuric acid. Thermal decomposition of such sludges is resorted to in order to break up the organic sulfates and sulfonic acids which they contain, and preferably to recover sulfur dioxide in a form in which it can be reconverted into sulfuric acid.

The problem of recovering sulfur values from petroleum sludges is one of long standing but no commercially successful solution was developed until 1930, when the Hechenbleikner process was designed. This process was based on the principle of passing the acid sludge through a rotary kiln in countercurrent contact with a stream of heating gases, the kiln temperatures being carefully controlled in a plurality of heating zones. Commercial use has shown that this process is highly successful with acid sludges having a relatively low free hydrocarbon content, but with sludges of higher oil content the heating gases are so diluted by additional steps necessary to remove the oil that only a relatively weak $SO_2$ gas is obtained.

In order to render the sludge decomposition process adaptable to high oil sludges, it was found necessary to use hot, non-gaseous material as a heating medium, and preferably hot, finely divided solids. Accordingly, a method was developed in which acid sludges of relatively high oil content were intimately mixed with hot sand or other hot, non-gaseous heating materials in a rotary kiln, the heat of the sand being transferred to the sludge by reason of its intimate admixture therewith and the non-volatile constituents of the sludge being transformed into coke. The details of this process are described in Patents Nos. 2,028,713 to Frank J. Bartholomew and 2,028,725 to James M. Rumple.

The present invention is an improvement in the sludge decomposition steps described in the Bartholomew and Rumple patents which results in the production of sulfur dioxide gases having a lower content of non-condensible hydrocarbons and an improved behavior of the sludge during its decomposition. The invention therefore has as objects the decomposition of acid sludge, and particularly high oil acid sludges, by a process which materially reduces the amount of cracking of the hydrocarbons contained in the sludge and the consequent production of a sulfur dioxide gas from such sludges having a lower percentage of volatile hydrocarbons. Further important objects of the invention relate to improvements in the construction and method of operation of rotary sludge decomposition kilns whereby difficulties caused by the frothing of an intimate mixture of acid sludge and extremely hot, non-gaseous heating material are avoided.

As is described in the patents above referred to, the basis of the Bartholomew and Rumple process is the intimate admixture of acid sludge with a stream of hot, non-gaseous heating material which is heated to high temperatures of the order of 1500° F. These extremely high temperatures are necessary in order to introduce the requisite number of heat units into a rotary kiln while maintaining a reasonably high ratio of acid sludge to heating material, and such temperatures produce the best results in large scale operation. We have found, however, that if fresh acid sludge is permitted to remain in intimate contact with solids heated to such high temperatures for any length of time, a substantial proportion of the hydrocarbon oil content of the sludge will be cracked into hydrocarbons of much lower molecular weight. Most of these cracked hydrocarbons are permanent gases at atmospheric temperatures and can only be removed from the sulfur dioxide gases by combustion in a secondary furnace. This of course increases the percentage of inert constituents in the resulting purified sulfur dioxide gas and requires a larger sulfuric acid plant to make the same amount of sulfuric acid from it.

In order to overcome these operating difficulties, we have developed a sludge decomposition kiln of modified construction and a novel method of applying the sludge to the solid heating material without producing an intimate mixture of sludge and heating medium during the first stages of the process. When acid sludges are heated there occurs a sudden evolution of gas which causes the sludge to intumesce or swell up in the form of a plastic froth, and this is especially true of acid sludges having a relatively high oil content. When the incoming acid sludge is intimately mixed with a finely divided heating medium in a rotary kiln, this plastic froth acts as a binder and causes the granules of the heating medium to stick together and form large masses in the kiln. This coalescence or "balling up" of the solid granules of the heating medium greatly interferes with the discharge of gases and hydrocarbon vapors from the acid sludge, and causes the hydrocarbons to be held in close contact with the intensely hot solids for so long that they are to a large extent cracked instead of being immediately evaporated off. By our improved method of contacting the acid sludge and the heating medium we overcome this problem of coalescence and obtain a more gradual and uniform decomposition of the sludge while permitting free evolution of hydrocarbon vapors with a minimum of cracking.

In its broader aspects, our improved method is not necessarily limited to the operation of a rotary kiln, but may be carried out in other types of apparatus such as those employing a moving grate. Essentially the method comprises the step of establishing a continuous stream of the hot, non-gaseous heating material, preferably in the form of discrete particles or granules such as hot sand or hot coke which in the case of a rotary kiln is admitted at the necessarily high temperature range of about 1500° F. This stream is given a preliminary mixing or conditioning period, in which the entire mass of particles is permitted to reach a uniform temperature. The acid sludge is then discharged upon one or more of the outer surfaces only of this stream of heating material, so that the heat of the solids is transmitted to the acid sludge without substantial admixture of the stream of solids with the sludge.

By this method of operation the plastic froth from the sludge cannot cause coalescence of the solid granules of the heating material and the heating material cannot impede the free evolution of gases from the sludge, for the swelling and frothing of the sludge takes place in free space adjacent the stream of heating material and the froth does not mix with it. In other words, the process of the present invention causes the sludge to swell away from the heating material and not into a mass of finely divided heating material as is the case in the earlier process. When intumescence and frothing of the sludge has subsided the sludge is then mixed more intimately with the heating material to drive out the remainder of its volatile contents. This can safely be done in the later stages of the process without danger of "balling up" the heating material or causing excessive cracking of the hydrocarbons, for the temperature of the heating medium has fallen at this stage to about 600–800° F. and the major part of the hydrocarbons has been evaporated off.

Although our invention in its broader aspects is not limited to any specific form of apparatus, we regard it as being particularly applicable for use in rotary kilns, and for this reason we consider some of its more specific aspects relating to such kilns as constituting further additional features of the invention. Rotary kilns of the type which will subsequently be described form a simple means for maintaining at proper temperature a stream of hot, finely divided solid material upon which the acid sludge may be discharged, and the kiln may readily be rotated at such a slow rate that intumescence of the sludge has subsided before an intimate mixture of the sludge and heating material is obtained. Moreover, the continuous rotation of the kiln readily produces granulation of the semi-plastic, non-solid constituents of the acid sludge, so that they are obtained from the discharge outlet of the kiln in the form of a granular, coke-like carbonaceous residue which can readily be used as fuel for the heating steps of the process.

The invention will be further described in detail with reference to the accompanying drawing, in which Fig. 1 is a diagrammatic elevation, partly in section, of an acid sludge decomposition plant embodying the principles of the present invention, and Fig. 2 is a detail in vertical section showing the conditions within a sludge decomposition kiln when the present invention is employed.

Referring to Fig. 1, the general combination of the apparatus is a part of the Bartholomew and Rumple process referred to above, and constitutes no part of the present invention. It is shown in somewhat diagrammatic form to illustrate one commercially successful process in which the steps constituting the present invention may be applied with advantage, but it should be understood that the invention in its broader aspects is not limited to this particular process. The acid sludge decomposition plant illustrated in this figure consists generally of a rotary sludge decomposition kiln 1 designed in accordance with the present invention, a heating kiln 2, and sludge preheating and conditioning tanks 3 and 4, together with the necessary piping and conveyors to complete the process.

The sludge conditioning tanks 3 and 4 are vertical tanks provided with inlet lines 5 and 6, heating coils 7 and 8, and with recirculating pumps 9 and 10 for continuously recirculating acid sludge through the tanks in order to maintain it in fluid condition. It should be understood that acid sludges from various sources have widely differing physical as well as chemical characteristics, but that all such sludges can be heated with steam coils to a degree sufficient to impart fluidity without decomposition. Acid sludge pumps 11 and 12 are provided for preferably continuous withdrawal of sludges from the two recirculating tanks through discharge lines 13 and 14, these lines being joined as at 15 to permit mixing of the sludges just prior to their introduction into the sludge decomposition kiln 1. By this means it is possible to obtain a sludge mixture having optimum characteristics for the sludge decomposition process, but additional amounts of the same or different sludges may be introduced through the inlet lines 16 and 17 from other recirculating heating tanks similar to the tanks 3 and 4 if desired.

The heating kiln 2 is preferably an elongated rotary kiln in which a non-gaseous heating material such as sand, finely divided coke and the like may be heated to temperatures of about 1500° F. Preferably the solid, coke-like residue resulting from the decomposition of acid sludge is employed as fuel for obtaining high temperatures in the kiln 2, and this coke may be elevated from the sludge decomposition kiln outlet through an elevator 20 and conveyor line 21 to a hopper 22 from which it is fed into the fuel inlet end of the kiln 2 through an inlet pipe 23. Air for combustion is forced into the far end of the kiln by blower 24, preferably through an air inlet 25 which surrounds a gas or fuel oil burner 26 which operates as a pilot burner. The coke may be mixed with a non-gaseous heating medium such as sand or the like, in which case the amount of air introduced through the air inlet 25 is such as to burn out substantially all the coke and heat the sand to the required temperature of about 1500° F. Preferably, however, hot coke from the sludge decomposition kiln is itself used as the heating medium, and in this case the amount of air introduced to the heating kiln is only enough to burn sufficient of the coke to raise the temperature of the entire amount passing through the heating kiln to about 1500° F.

In the preferred modification of the process in which coke alone is employed as the heat transfer medium there is usually more coke produced in the sludge decomposition kiln 1 than is necessary for recirculation through the process, and the excess overflows from the outlet 30 of the hopper 22 and is discharged into the storage hopper 31 by conveyor 32. The coke obtained in this manner may be used as fuel for other processes, and it is an advantage of the present invention that it improves the quality of the coke so produced by obtaining a more complete removal of available sulfur therefrom. Accordingly, we regard the application of our process steps to a heating material consisting of finely divided coke as a further important feature of our invention.

The novel sludge decomposition kiln 1 which constitutes a feature of the present invention is similar to the rotary kiln previously used in that it includes a decomposition kiln section 35, lined on its interior as at 36 with acid-proof brick, and end pieces 37 and 38. The kiln of the present invention, however, is provided near its inlet end with an annular flange or dam 39 which divides its interior into a large sludge decomposition section 40 and a relatively small mixing or conditioning chamber 41 into which the hot coke or other fuel is fed through the inlet pipe 43 leading from the heating kiln 2. When granular coke heated to about 1500° F. is taken from the heating kiln 2 through its outlet piece 45 and is passed through a plunger feeder 46 or similar feeding mechanism it is fed through the inlet pipe 43 into the conditioning chamber 41 formed between the dam 39 and the end piece 37 of the kiln and is there thoroughly mixed and brought to a uniform temperature of about 1000–1200° F. before it is passed into the main section 40 of the decomposition kiln.

The decomposition kiln is supported on rollers (not shown) and is rotated at a rate of 3–5 revolutions per minute by means of the annular gear 50 which is integral with its inlet end. This rate of rotation is so slow that the coke fed into the inlet chamber 41 has ample time to become mixed and uniform in temperature before it passes over the dam 39 into the sludge decomposition chamber 40, and by this means local overheating and cracking of the hydrocarbons of the sludge is prevented. The slow rotation of the kiln also causes a slowly moving but continuous stream of the hot coke or other nongaseous heating material to be established in the chamber 40 which produces a uniform decomposition of the acid sludge and evolution of gas therefrom as will now be described:

The acid sludge, which has been mixed and conditioned in the manner previously described, is introduced into the sludge decomposition kiln 1 through a pipe 55, as illustrated on the drawing. This pipe extends so far into the kiln that the sludge is discharged only in the large chamber 40 and does not come in contact with the heated coke particles in the mixing chamber 41. The sludge pipe 55 is mounted off to one side of the center of rotation of the kiln, on the side in which the kiln wall is moving upwardly. By reason of this location, and particularly because the inlet pipe is extended some distance into the kiln, the incoming sludge is discharged only upon the outer surface of the stream of coke 56 in the kiln, and there is no immediate intimate mixture of the sludge and coke as would be the case if the sludge were fed in immediately adjacent the inlet pipe 43. On the contrary, the sludge is introduced in such a manner that the heat of the coke is transmitted to it from below, and the frothing and intumescence which takes place as a result of this heating causes the sludge to swell up and away from the bed of coke. As a result of this method, the volatile hydrocarbon content of the sludge is free to evaporate off and the amount of cracking which takes place is reduced to a minimum.

We have found that when the process of the present invention is in operation there are three distinct zones in the decomposition chamber 40 of our heating kiln, and Fig. 2 is a somewhat diagrammatic illustration of the conditions in each zone. The first or sludge inlet zone 57 is characterized by the presence of a large volume of plastic and semi-plastic froth 58, which is created by the continuous and free evolution of sulfur dioxide and hydrocarbon vapors from the sludge. As the incoming stream of sludge 59 falls on the intensely hot granular coke 60 it is almost instantly transformed into a swollen mass from which these gases are freely given off. As the sulfur dioxide and volatile hydrocarbons are driven out by the heat of the coke this mass gradually passes through the plastic or sticky stage, and when the intumescence and evolution of gases has subsided the remainder is a solid carbonaceous residue. During the plastic stage, however, the mass tends to maintain itself separate from the underlying stream of coke by reason of the continuous gas evolution, and for this reason there is relatively little mixing of the sludge and coke in the inlet zone 57.

The second or carbonization zone 61 is in the central part of the chamber 40, and represents the area where the sludge has passed through its violently intumescent stage and has begun to adhere to the particles of coke. The coke particles in this portion of the kiln therefore increase in diameter by accretion, and further amounts of sulfur dioxide and hydrocarbon are volatilized from the hardening coke by the heat of the granule. In this zone, intumescence of the sludge has subsided and a fairly intimate mixture of the sludge and coke is formed by the gradual rotation of the kiln, so that the end of the zone is marked by the existence of relatively large particles each consisting of a granule of the original coke or other heating material surrounded by an outer layer of carbonaceous residue from the sludge.

The third and final zone 62 in the kiln is one of further granulation, where the rotation of the kiln and the cooling and hardening of the sludge residue cause the larger particles from the central zone 61 to be granulated. Very little evolution of volatiles takes place in this zone, and it is provided principally to permit the coke to cool down to a temperature where it will remain granular in the subsequent heating steps without sticking together.

The coke from the third zone 62 is finally discharged from the kiln through the outlet pipe 65 and is transmitted through a plunger feeder 66 into the elevator 20 where it is returned by way of conveyor 21 to the hopper 22 for reintroduction into the heating kiln 2. The sulfur dioxide and hydrocarbon vapors are drawn off through the pipe 66 to condensers in which the condensible hydrocarbons are removed and the gas is made ready for a contact sulfuric acid process, and it is an advantage of the invention that the content of uncondensible hydrocarbons in these gases is very low.

From the foregoing it will be seen that the present invention provides a process, and a preferred form of apparatus, in which the operating difficulties created by the formation of an intimater mixture of acid sludge and granular heating medium are avoided. In accordance with this process the incoming acid sludge is maintained in contact with an outer surface of a stream of the hot solids, whereby an effective transfer of heat is obtained, but the process is operated in such a manner that intumescence of the sludge has subsided before it is intimately mixed with the heating material. In the meantime, however, the heat of the coke has been effectively utilized to drive out most of the hydrocarbons from the sludge with a minimum of cracking, and the hydrocarbons so evolved can readily be condensed and form an important source of fuel.

Although the invention has been illustrated with reference to a specific modification thereof, and although preferred temperatures and conditions have been specified it is understood that these specific details are given primarily for purposes of illustration and that the invention in its broader aspects is not limited thereto. On the contrary, it is understood that the invention is limited only by the scope of the claims appended hereto.

What we claim is:

1. A method of thermally decomposing acid sludges which form a plastic froth when heated which method comprises introducing a stream of hot granular solid material into a rotary kiln, conditioning the solid material by mixing it until its temperature is uniform, then passing the conditioned material in a continuous stream through the remainder of the kiln, discharging a stream of acid sludge upon the upper surface of said conditioned material and thereby causing the sludge to swell and froth in free space without causing coalescence of the solid granules of heating material, and rotating the kiln containing the sludge and heating material at such a rate that intumescence of the sludge has subsided before an intimate mixture of the sludge and heating material is obtained.

2. A method according to claim 1 in which the granular solid material is hot coke obtained by heating the carbonaceous residue of the sludge.

3. A method of decomposing acid sludge from the sulfuric acid purification of hydrocarbonaceous material to yield a gas containing sulfur dioxide and only relatively small amounts of cracked hydrocarbons which comprises establishing a bed of highly heated finely divided solid particles sufficient in amount and temperature to decompose the sludge and to form a coke-like solid residue in intimate admixture therewith, depositing acid sludge upon an outer surface only of said stream of solid particles, retaining the sludge upon said outer surface until the first rapid gas evolution has lessened, and then thoroughly mixing the partially decomposed sludge with the solid particles to complete the sludge decomposition and sulfur dioxide evolution.

4. A method according to claim 3 in which the finely divided solid particles are hot coke obtained by heating the carbonaceous residue of the sludge.

5. A method of decomposing acid sludge from the sulfuric acid purification of hydrocarbonaceous material to yield a gas containing sulfur dioxide and only relatively small amounts of cracked hydrocarbons which comprises establishing a stream of highly heated finely divided solid particles in a rotary kiln, the amount and temperature of the solid particles being sufficient to decompose the sludge and to form a coke-like solid residue in intimate admixture therewith, depositing acid sludge upon an outer surface only of said stream of solid particles, retaining the sludge upon said outer surface until the first rapid gas evolution has lessened and then thoroughly mixing the partially decomposed sludge with the solid particles by the rotation of the kiln to complete the sludge decomposition, and continuously removing the sulfur dioxide gas from the zone of evolution.

6. A method according to claim 5 in which the finely divided solid particles are hot coke obtained by heating the carbonaceous residue of the sludge.

BLAKESLEE BARNES.
NICOLAY TITLESTAD.